(12) United States Patent
Antonov (10) Patent No.: US 7,003,511 B1
(45) Date of Patent: Feb. 21, 2006

(54) MINING AND CHARACTERIZATION OF DATA

(75) Inventor: Alexander Antonov, Moscow (RU)

(73) Assignee: Infotame Corporation, Los Gatos, CA (US)

( * ) Notice: Subject to any disclaimer, the term of this patent is extended or adjusted under 35 U.S.C. 154(b) by 374 days.

(21) Appl. No.: 10/210,937

(22) Filed: Aug. 2, 2002

(51) Int. Cl.
*G06F 17/30* (2006.01)

(52) U.S. Cl. ............................................... 707/3; 707/4
(58) Field of Classification Search .................... 707/2, 707/3, 4, 5, 6, 7, 8, 9, 10, 101, 104.1
See application file for complete search history.

(56) References Cited

U.S. PATENT DOCUMENTS

| | | | | |
|---|---|---|---|---|
| 5,819,260 A | * | 10/1998 | Lu et al. | 707/3 |
| 5,893,092 A | * | 4/1999 | Driscoll | 707/5 |
| 6,012,053 A | * | 1/2000 | Pant et al. | 707/3 |
| 6,549,897 B1 | * | 4/2003 | Katariya et al. | 707/5 |
| 6,640,218 B1 | * | 10/2003 | Golding et al. | 707/2 |
| 6,647,383 B1 | * | 11/2003 | August et al. | 707/3 |
| 6,651,058 B1 | * | 11/2003 | Sundaresan et al. | 707/6 |

* cited by examiner

*Primary Examiner*—Jeffrey Gaffin
*Assistant Examiner*—Yicun Wu
(74) *Attorney, Agent, or Firm*—Sean M. Fitzgerald (57) ABSTRACT

Method and system for identifying and characterizing publications containing a specified search-phrase, using number of, and relative frequency of, occurrences of the search-phrase (and, optionally, of synonym-phrases) in each publication to develop a measure of significance that represents the relevance of each identified publication (in which the specified search-phrase occurs) to the original search. The measure of significance can also be based on minimum separation distance between search-phrase occurrences and/or upon occurrences of search-phrase synonyms and time intervals within which the publication release dates fall.

2 Claims, 9 Drawing Sheets

Figure 1

| Key Descriptors ||| Key Descriptor Pairs |||
|---|---|---|---|---|---|
| Refine query || | Refine query || |
| Include | Exclude | Key Descriptors | Rating | Include | Exclude | Key Descriptor Pairs | Rating |
| ☐ | ☐ | GORE | 225569 | ☐ | ☐ | PRESIDENT GEORGE | 112613 |
| ☐ | ☐ | REPUBLICAN | 128346 | ☐ | ☐ | AL GORE | 77421 |
| ☐ | ☐ | FLORIDA | 81481 | ☐ | ☐ | WHITE HOUSE | 60322 |
| ☐ | ☐ | CHENEY | 73429 | ☐ | ☐ | GEORGE BUSH | 21524 |
| ☐ | ☐ | DEMOCRAT | 61303 | ☐ | ☐ | ELECTORAL VOTE | 20744 |
| ☐ | ☐ | POWELL | 56259 | ☐ | ☐ | TEXAS GOVERNOR | 20503 |
| ☐ | ☐ | RECOUNT | 51138 | ☐ | ☐ | PRESIDENT ELECT | 19118 |
| ☐ | ☐ | TEXAS | 43429 | ☐ | ☐ | DICK CHENEY | 17413 |
| ☐ | ☐ | MISSILE | 38737 | ☐ | ☐ | COLIN POWELL | 17230 |
| ☐ | ☐ | SENATE | 30278 | ☐ | ☐ | BUSH ADMINISTRATION | 16506 |
| ☐ | ☐ | CONVENTION | 28088 | ☐ | ☐ | DEMOCRAT AL | 15782 |
| ☐ | ☐ | WORD | 27518 | ☐ | ☐ | PRESIDENT AL | 14991 |
| ☐ | ☐ | BALLOT | 25769 | ☐ | ☐ | ELECT GEORGE | 14363 |
| ☐ | ☐ | ASHCROFT | 24878 | ☐ | ☐ | PRESIDENTIAL CANDIDATE | 14305 |
| ☐ | ☐ | BORODIN | 24824 | ☐ | ☐ | ENGLISH GEORGE | 14223 |
| ☐ | ☐ | COUNTY | 20157 | ☐ | ☐ | REPUBLICAN GEORGE | 13950 |
| ☐ | ☐ | ELECT | 19552 | ☐ | ☐ | PRESIDENT BUSH | 13597 |
| ☐ | ☐ | MCCAIN | 18734 | ☐ | ☐ | PALM BEACH | 13409 |
| ☐ | ☐ | ELECTORAL | 17777 | ☐ | ☐ | MISSILE DEFENSE | 13101 |
| ☐ | ☐ | GOVERNOR | 17336 | ☐ | ☐ | RUNNING MATE | 13060 |
| ☐ | ☐ | TAX | 15400 | ☐ | ☐ | BUSH IS | 12455 |
| ☐ | ☐ | COLIN | 15349 | ☐ | ☐ | SUPREME COURT | 12197 |

Figure 2

| | Sample | | Number of documents | |
|---|---|---|---|---|
| 1 | 1.3.2000 - 31.3.2000 | 127 | | ✓ |
| 2 | 1.4.2000 - 30.4.2000 | 303 | | ✓ |
| 3 | 1.5.2000 - 31.5.2000 | 486 | | ✓ |
| 4 | 1.6.2000 - 30.6.2000 | 572 | | ✓ |
| 5 | 1.7.2000 - 31.7.2000 | 941 | | ✓ |
| 6 | 1.8.2000 - 31.8.2000 | 2135 | | ✓ |
| 7 | 1.9.2000 - 30.9.2000 | 1200 | | ✓ |
| 8 | 1.10.2000 - 31.10.2000 | 2045 | | ✓ |
| 9 | 1.11.2000 - 30.11.2000 | 6360 | | ✓ |
| 10 | 1.12.2000 - 31.12.2000 | 4891 | | ✓ |
| 11 | 1.1.2001 - 31.1.2001 | 4320 | | ✓ |
| 12 | 1.2.2001 - 28.2.2001 | 4165 | | ✓ |
| 13 | 1.3.2001 - 31.3.2001 | 3785 | | ✓ |
| 14 | 1.4.2001 - 30.4.2001 | 3429 | | ✓ |
| 15 | 1.5.2001 - 31.5.2001 | 4670 | | ✓ |
| 16 | 1.6.2001 - 30.6.2001 | 4754 | | ✓ |
| 17 | 1.7.2001 - 31.7.2001 | 2941 | | ✓ |
| 18 | 1.8.2001 - 31.8.2001 | 1830 | | ✓ |
| 19 | 1.9.2001 - 30.9.2001 | 3733 | | ✓ |
| 20 | 1.10.2001 - 31.10.2001 | 3461 | | ✓ |
| 21 | 1.11.2001 - 30.11.2001 | 1556 | | ✓ |
| 22 | 1.12.2001 - 31.12.2001 | 2330 | | ✓ |
| | The Total is: | 60034 | | ACTION |
| | | | Delete selected samples | Do |

Query "Query_07.03.2002 20:40:09" (Number of documents (equals): 60034)

Query: george bush                    (FIND)

Search results

1. AFP
... EAA0598 3 I 0529 USA /AFP-AH26 US-Cuba-boy-vote CORRECTION
•Bush demands immediate action in Cuban boat boy case
ATTENTION - CORRECTS to delete xxx INS to decide Tuesday xxx from in third para, CLARIFIES fourth para to read xxx giving the child permanent US residency status xxx not child US residency status until his case is resolved. Herewith corrected repetition ///
WASHINGTON, March 31 (AFP) - Republican presidential candidate •George W. •Bush demanded his rival Vice President Al Gore back his words with action Friday by using his office to put an immediate end to the standoff over Cuban castaway Elian ...

2. AFP
... EAA0638 3 I 0709 USA /AFP-AM46 US-Cuba-boy-Gore sched-lead
Gore steps into messy Cuban boy battle in high-risk political move
by Gretchen Cook
ATTENTION - RECASTS; ADDS •Bush, White House reax ///
WASHINGTON, March 31 (AFP) - Cuban castaway Elian Gonzalez became a crucial campaign test for Vice President Al Gore Friday, when his White House rival challenged him to use his office to keep the boy in the United States and thus prove he is not just playing politics with the issue."
Instead of subjecting Elian and his family to another difficult weekend of doubt, Al Gore should use his influence today to give Elian a ray of hope," said Texas Governor •George ...

Information portrait
Use Key Descriptors for specifying the query.

| Mark the words to be added to the query and click on Specify | |
|---|---|
| Include/Exclude | Word |
| ☐ | GORE |
| ☐ | REPUBLICAN |
| ☐ | FLORIDA |
| ☐ | CHENEY |
| ☐ | DEMOCRAT |
| ☐ | POWELL |
| ☐ | RECOUNT |
| ☐ | TEXAS |
| ☐ | MISSILE |
| ☐ | SENATE |
| ☐ | CONVENTION |
| ☐ | WORD |
| ☐ | BALLOT |
| ☐ | ASHCROFT |

MINING AND CHARACTERIZATION OF DATA

FIELD OF THE INVENTION

This invention is related to identification and characterization of information items on a specified topic in a database.

BACKGROUND OF THE INVENTION

Today, a knowledge worker is deluged with written or otherwise-published information from books, reports, periodicals, the Internet and other sources, so much so that relevant information is often mixed and/or saved with information that is irrelevant or of no present interest to the worker. Much, although not all, of this information is often stored in one or more "data mines" for possible review at a later time. As this information accumulates, it becomes more and more difficult for the worker to distinguish the relevant from the irrelevant and, more important, to distinguish the more relevant from the less relevant.

What is needed is a system that (1) allows a worker to identify "found" publications, in electronic format, that contain one or more uses of a specified word or word combination and (2) provides the worker with an assessment of the relative significance of phrases that often appear in the found publication, and of each found publication itself, based on a sequence of criteria with user-specified parameters. Preferably, the significance index should take into account one or more of the number of times and relative frequency of occurrence of the specified word/combination, separation distance between nearest-neighbor occurrences, occurrence of synonyms for the specified word/combination, and time interval(s) for the publication.

SUMMARY OF THE INVENTION

These needs are met by the invention, which provides a system and associated method for searching for one or more relevant publications in a collection of publications. In one embodiment, the method involves:
receiving a search-phrase whose occurrence is to be searched for in a selected collection of publications;
performing a search for the search-phrase within the collection; and
when at least one occurrence of the search-phrase is found in at least one publication, referred to as a "found publication", assigning a date to the found publication and aggregating the found publications as a super-document;
identifying selected "found phrases" that occur in one or more of the found publications, and assigning a measure of significance to the occurrence each of the found phrase in all found publications;
displaying at least one of the found phrases and the measure of significance assigned to the corresponding found phrase; and
for each of at least one selected time interval, counting and displaying the number of found phrases having an assigned date within each of the at least one selected time interval.

The invention allows a user to specify one or more search phrases, perform a search of a database of publications in an electronic format, identify a group of one or more "found publications" that contain the search phrase(s) found, individually and collectively analyze the found publications to determine one or more characteristics of the found phrase within each found publication, and display the results of the analysis. This allows a user to extract relevant objective information from a collection of publications, without having to read and analyze each of the documents, and to highlight or otherwise identify topics of significant interest in the time interval covered by the data base.

BRIEF DESCRIPTION OF THE DRAWINGS

FIG. 5 illustrates a summary of contents provided for each of two found publications in a collection of publications.

DESCRIPTION OF BEST MODES OF THE INVENTION

The following several paragraphs set forth definitions that are adopted for purposes of disclosing and claiming the invention.

A "phrase" includes a word and a group of two or more consecutive words.

A "search-phrase" includes a word, a group of two or more consecutive words, and a grouping of two or more words or phrases that are separated by no more than n words ($n \geq 1$), and two or more words or phrases that are associated by one or more Boolean connectives.

A "found phrase" is an m1-word phrase (e.g., m1=1 or 2 or 3) that appears at least m2 times in a found publication, where m1 and m2 ($\geq 1$) are selected positive integers. Optionally, common articles, possessives and connectives, such as "a", "an", "the", "their", "our", "and", "or" and "but" may be ignored in identifying found phrases within a found publication.

A "Boolean connective" includes the Boolean logical connector operators AND, NAND, OR, NOR, XOR, XNOR and NOT.

A "Boolean grouping" is a group of phrases that includes "X B Y", where X and Y are phrases and B includes at least one Boolean connective.

A "monotonically increasing function" of a real variable x is a function f(x) that satisfies $f(x1) \geq f(x2)$ wherever $x1 \geq x2$. Note that this definition includes, but is not limited to, strictly monotonically increasing functions.

A "publication" includes writings, formally published documents, informally published information, Internet articles and announcements and similar public releases of information, all available in electronic format.

A "measure of significance" is a numerical value assigned to a group of one or more found publications, based on one or more criteria representing the perceived relevance of the found publication(s).

An "information portrait" is a characterization of one or more found phrases, based upon one or more measures of significance associated with the found phrase.

A "release date" is a publication date assigned to a publication.

A synonym search-phrase is another search-phrase that has at least one meaning that is substantially the same as at least one meaning of the given search-phrase. A set of "synonyms" for a selected word, such as "frequency" may include any or all of {cycles per second, Hertz, Hz, kHz, MHz, GHz, period (for an oscillating signal)}.

A "separation distance" between two words, A and B, in a publication is the minimum number of words that separate an occurrence of "A" and an occurrence of "B" in the publication. For example, in the sentence "It is well known that A is inconsistent with B in certain situations.", the separation distance for this sentence is 3 (words). Two words that are contiguous will have a separation distance of 0. A separation distance can be measured and assigned where two words (i) appear in the same sentence, (ii) appear in different sentences, (iii) appear in different paragraphs and/or (iv) appear in different sections of the publication.

A "relative temporal distance" $\Delta t(rel)$ of a found publication from a user-specified time interval is either 0, if the found publication has a release or publication date within that time interval, or the difference in time between the release or publication date and the nearest time point within that time interval (if positive).

Figure 1:
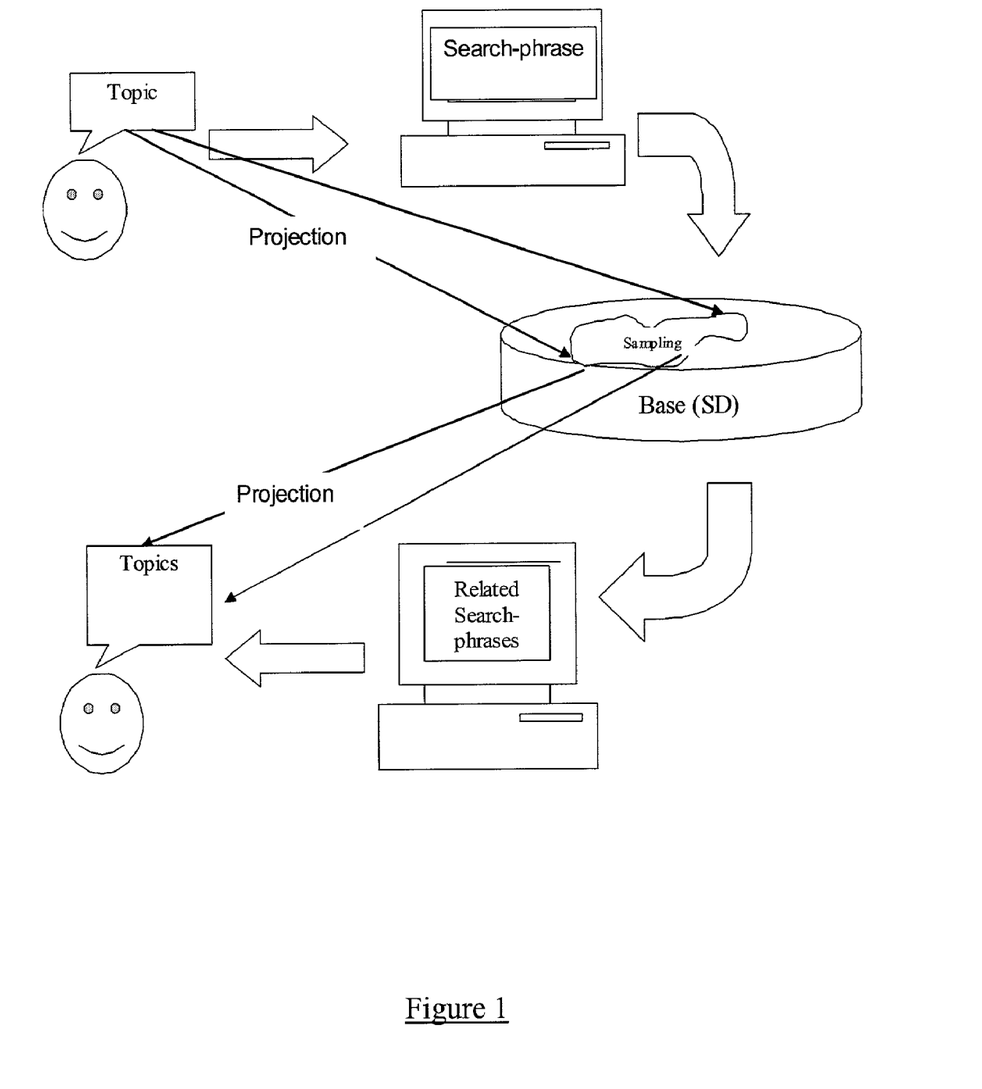
FIG. 1 illustrates an overall approach for the invention.

FIG. 1 illustrates a general approach of the invention, which optionally includes two procedures. In a first (direct task) procedure, a user provides a search and analysis ("SAA") system with a theme, for example, by specifying a search-phrase whose occurrence is to be sought in a specified database of publications. A publication in the specified database is an electronic ("soft") copy of a document, which may have been downloaded from a network, such as the Internet, may have been produced in electronic format originally, or may have been scanned in from a hard copy. The search-phrase provides a (first) theme, and this theme is projected onto the database of publications to search for and identify which publications contain at least one matching theme, referred to as "found publications." This identified group G of found publications is treated as a single super document SD for initial analysis, and provides an "information portrait" for the group G.

In a second (reverse) procedure, the super-document SD is analyzed to determine the number m of times a selected m1-word phrase (e.g., m1=1, 2 and/or 3) appears in the super-document. Each such phrase that appears at least once in the super-document is assigned a primary measure of significance, based on the number m and upon one or more other attributes associated with the phrase. For example, for a particular database of approximately one million publications, covering a time interval from 01 Mar. 2000 though 31 Dec. 2001, use of the search-phrase "George Bush" yields 60,034 found publications, all of which are aggregated into a super-document SD for initial analysis.

Each found publication is analyzed to determine the number m of times a selected m1-word phrase appears in the found publication, where $m1 \geq 1$; if $m \geq m2$ (a selected positive integer), the phrase becomes a "found phrase," which is not limited to the original search phrase. A primary measure of significance is assigned to each found phrase in a found publication, based upon a weighted sum of two or more measures of significance computed for the found phrase within the found publication. A secondary measure of significance is assigned to each found phrase in the super-document, based upon a sum of the primary measures of significance assigned to that found phrase in all found publications in the super-document.

Figure 2:
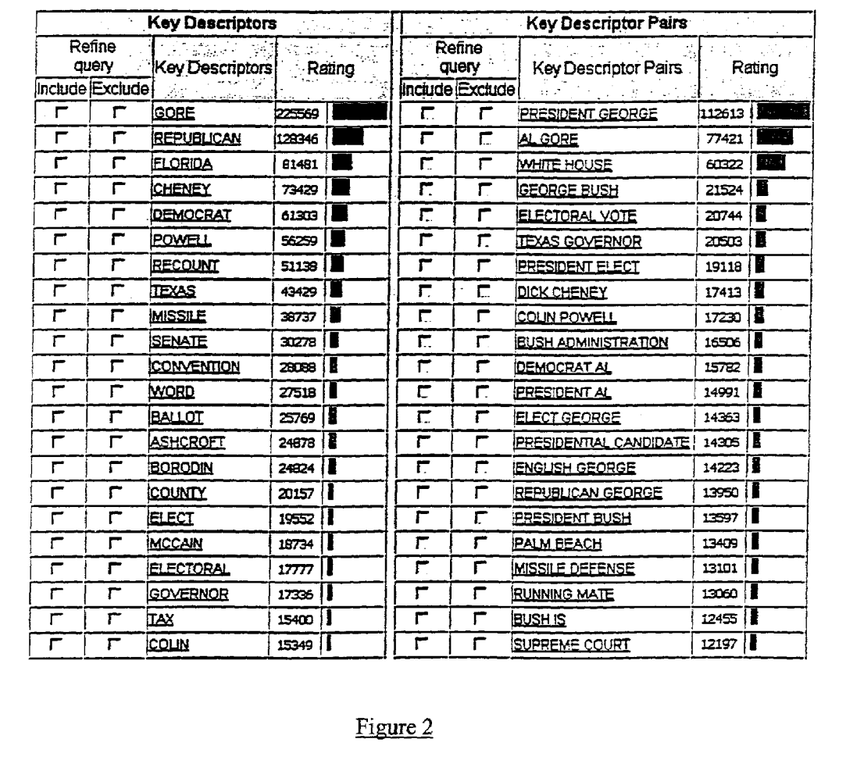
FIG. 2 illustrates a display of selected one-word and two-word found phrases in publications that contain the search-phrase "George Bush", and a primary measure of significance for each of these displayed phrases.

FIG. 2 sets forth an example, using the search-phrase "George Bush", of the 25 one-word phrases and 25 two-word phrases from the super-document that received the highest one-word and two-word secondary measures of significance, respectively. The top five one-word phrases are "Gore", "Republican", "Florida", "Cheney" and "Democrat", and the top five two-word phrases are "President George", "Al Gore", "White House", "George Bush" and "electoral vote", with other phrases having lower secondary measures of significance as shown.

Figure 3:
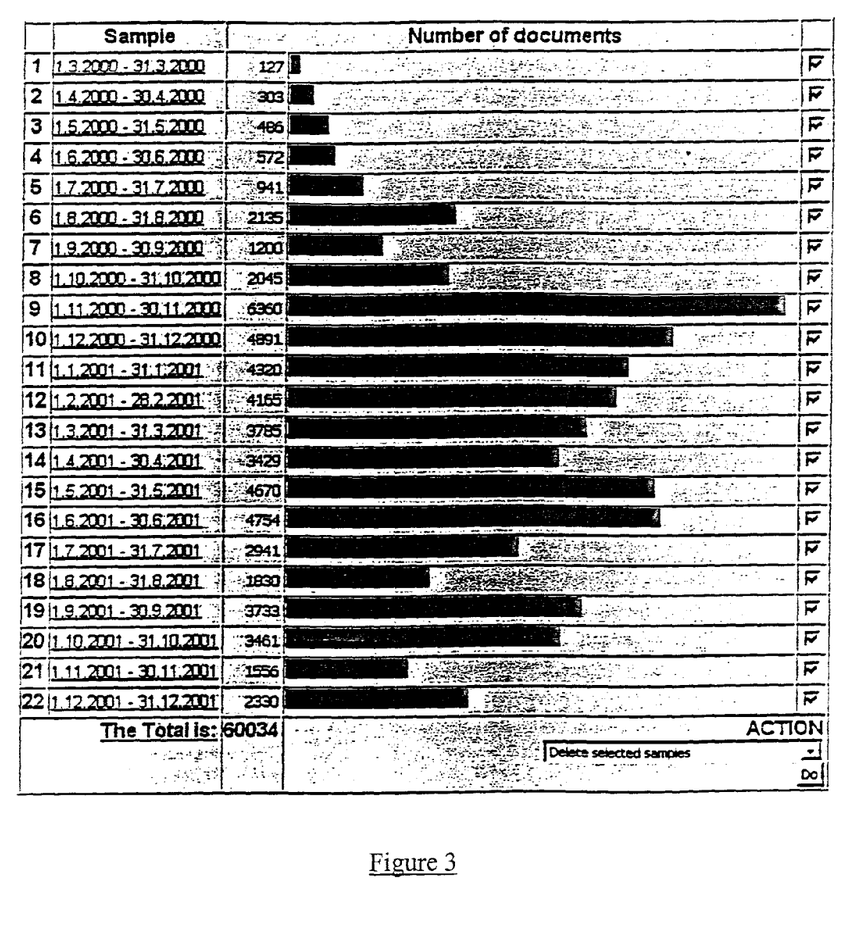
FIG. 3 illustrates a display of the number of found publications containing the search-phrase "George Bush" in each of a sequence of calendar month time intervals.

A date is assigned to each found publication, and the number n1 of found publications in each of a sequence of one or more selected (preferably non-overlapping) time intervals is counted and displayed. In FIG. 3, the selected time interval is one of the calendar months running from Mar. 1–31, 2000 through Dec. 1–31 2001. A different selected time interval, such as a seven-day week or a ten-day time interval or a three-month time interval, can also be used here. FIG. 3 indicates that the search-phrase "George Bush" appeared in 127 to 6360 of the found publications for each of the 22 calendar months from March 2000 through December 2001, with the "peak" occurring in November 2000.

Figure 4:
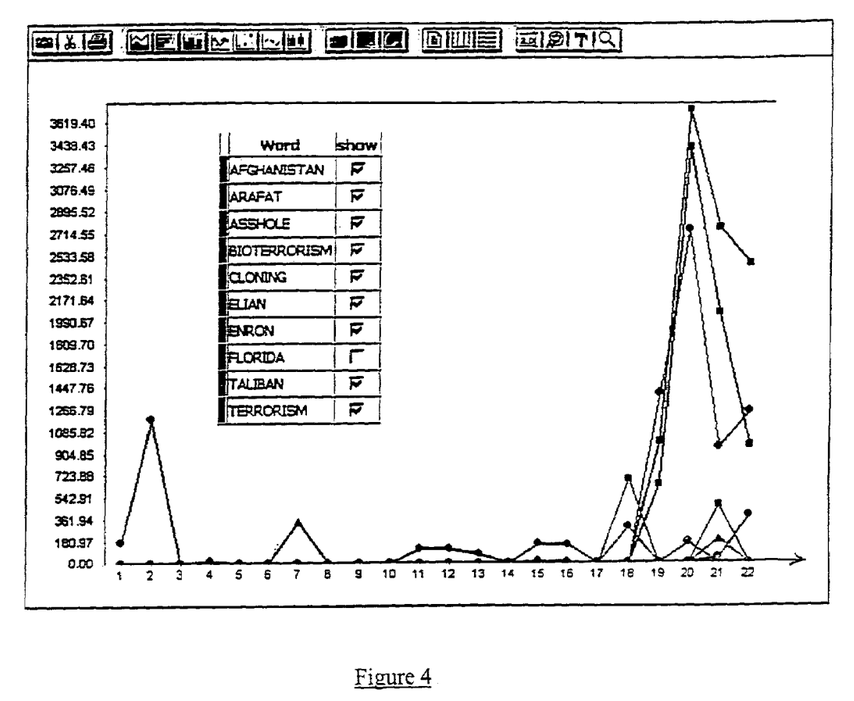
FIG. 4 is a graphical display of measures of significance for a selected phrase appearing in any of the found publications in FIG. 2 for each of a sequence of calendar month time intervals.

Optionally, the system selects found phrases (e.g., one-word or two-word or three-word) from the lists associated with FIG. 2 and determines and graphically displays, in FIG. 4, the values of the highest measures of significance for phrases appearing in the found publications having an assigned date within any of a selected sequence of one or more time intervals. Here, the time intervals here may, but need not, coincide with the time intervals used in connection with the search-phrase in FIG. 3. FIG. 4 graphically displays a plot (colors optional) of the values of measures of significance associated with several selected one-word found phrases, "Afghanistan" through "terrorism" for each of the 22 calendar months from March 2000 through December 2001.

Optionally, a short summary of a selected number of one or more of the found publications can be displayed so that the user can initially determine the relevance of that found publication to the user's goal. FIG. 5 illustrates a summary of two found publications for the search-phrase "George Bush", both found publications involving the Elion Gonzales controversy in the year 2000.

Figure 6A:
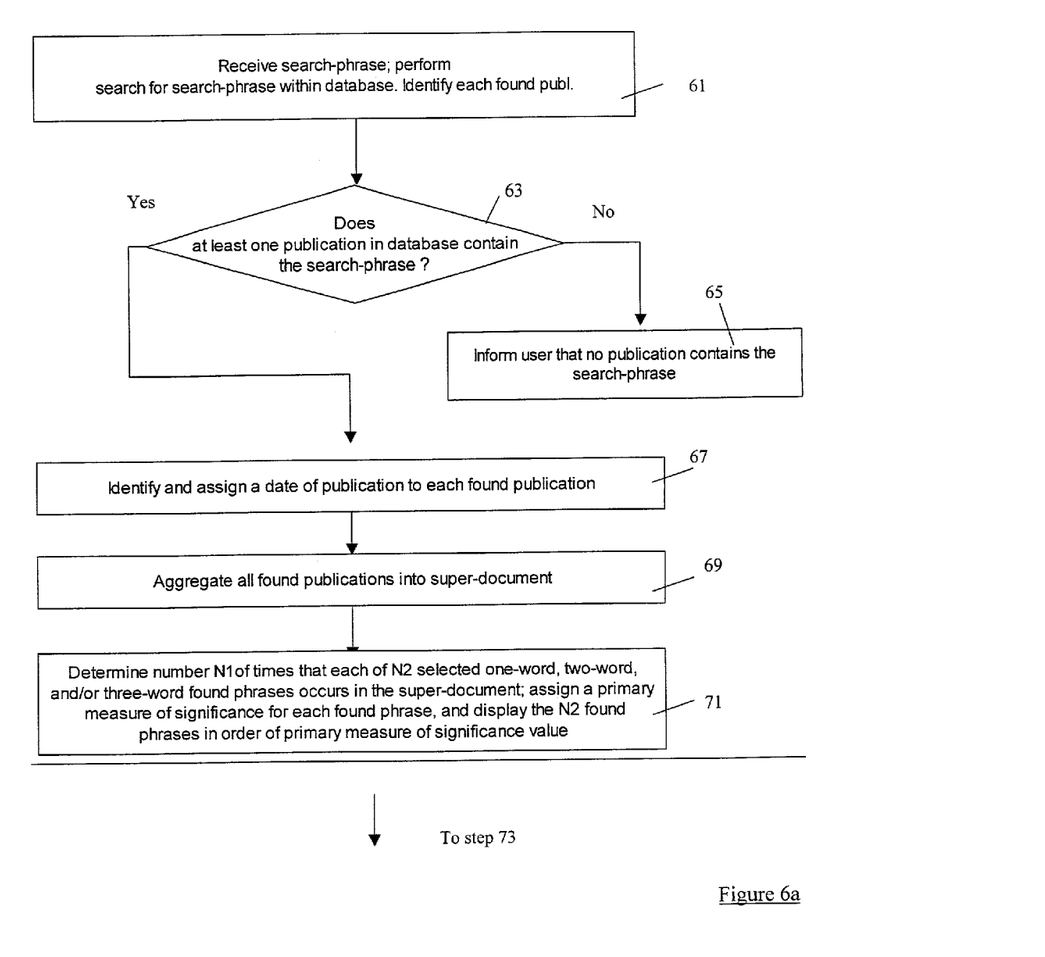
FIGS. 6 and 7 are flow charts of procedures for practicing the invention.
Figure 6B:
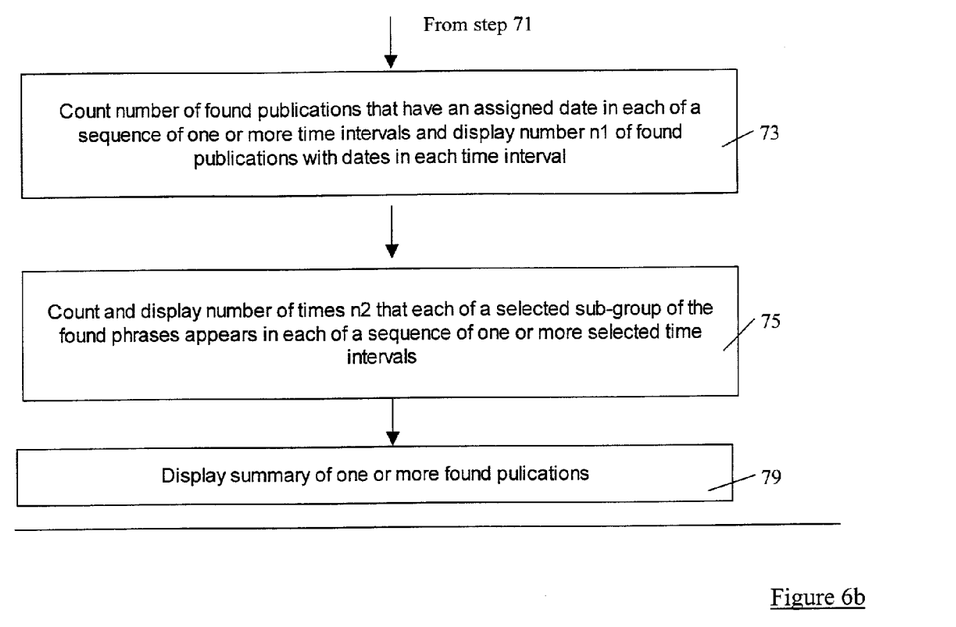

FIG. 6 is a flow chart of an initial procedure for receiving and processing a search-phrase for a database of publications. In step 61, the system receives a search-phrase, and performs a search for and identifies each found publication containing the search-phrase within the database. In step 63, the system determines if the search-phrase is found in at least one publication in the database. If the answer to the query in step 63 is "no", the system informs the user of this non-occurrence, in step 65, and optionally awaits a further user response.

If the answer to the query in step 63 is "yes", the system identifies each publication (referred to as a "found publication") in which the search-phrase occurs at least once and optionally assigns a date to each found publication, in step 67. In step 69 (optional), the system aggregates all found publications into a super-document SD. In step 71, the system determines a number N1 of times each of N2 selected one-word, two-word or three-word phrases (optionally including the search phrase) occurs in the super-document, assigns a primary measure of significance to each of these N2 "found phrases", and displays the N2 found phrases in order of the primary measure of significance value for each, where N1 ($\geq 1$) and N2 ($\geq 1$) are selected integers.

In step 73 (optional), the system counts the number of found publications that have an assigned date in each of a first sequence of one or more selected time intervals and displays the number n1 of found publications with an assigned date in each of the time intervals in this first sequence.

In step 75 (optional), the system counts and displays the values of measures of significance associated with each of a selected sub-group of the found phrases (from step 71) that appears in a found publication having an assigned date in one of a second sequence of at least one selected time interval. The first and second sequences of time intervals may coincide or may differ in one or more time intervals.

In step 77 (optional), the system optionally displays a summary of one or more of the found publications.

A second operation illustrated in FIG. 1 begins with the subset of found publications and subjects each subset member to a further analysis to determine one or more measures of significance that indicate how relevant this found publication is likely to be for the user. Here, the user may specify additional attributes or constraints that help "sharpen" the analysis.

Figure 7A:
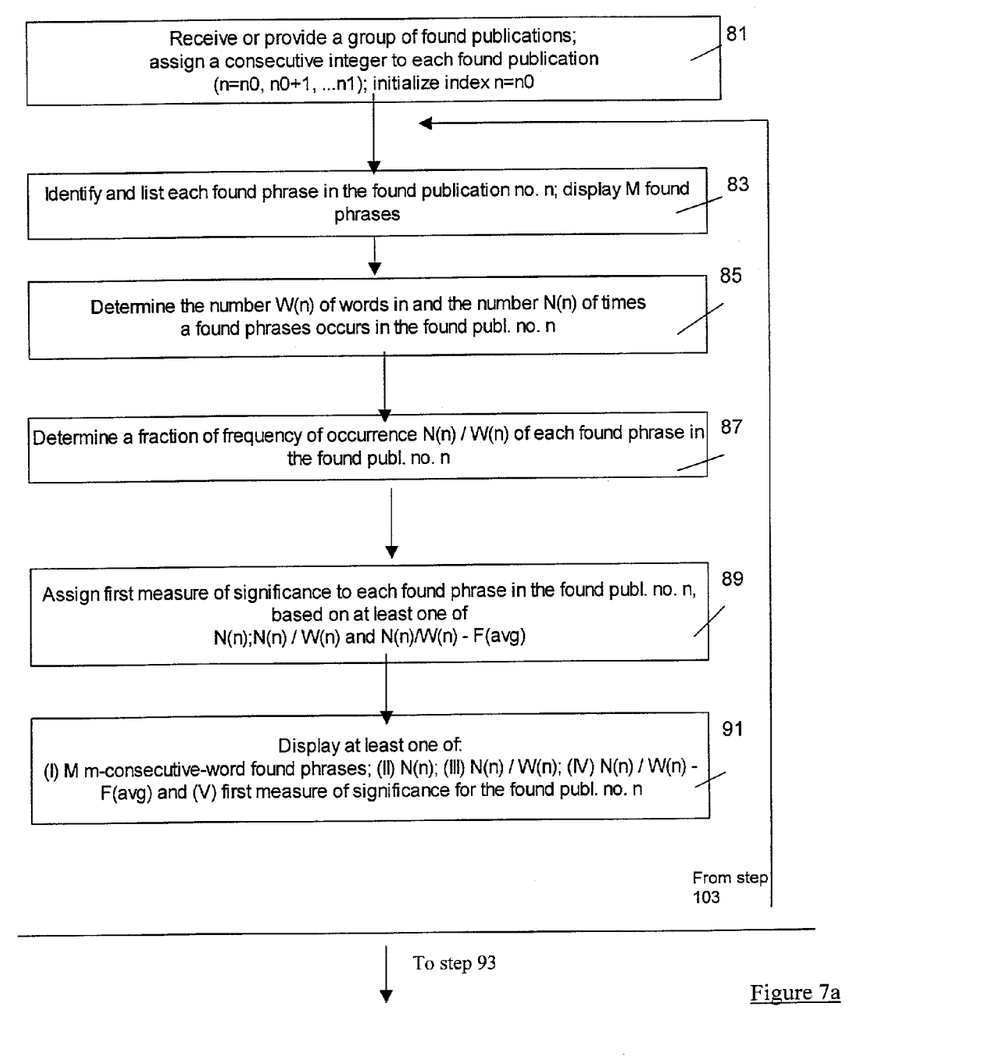
Figure 7B:
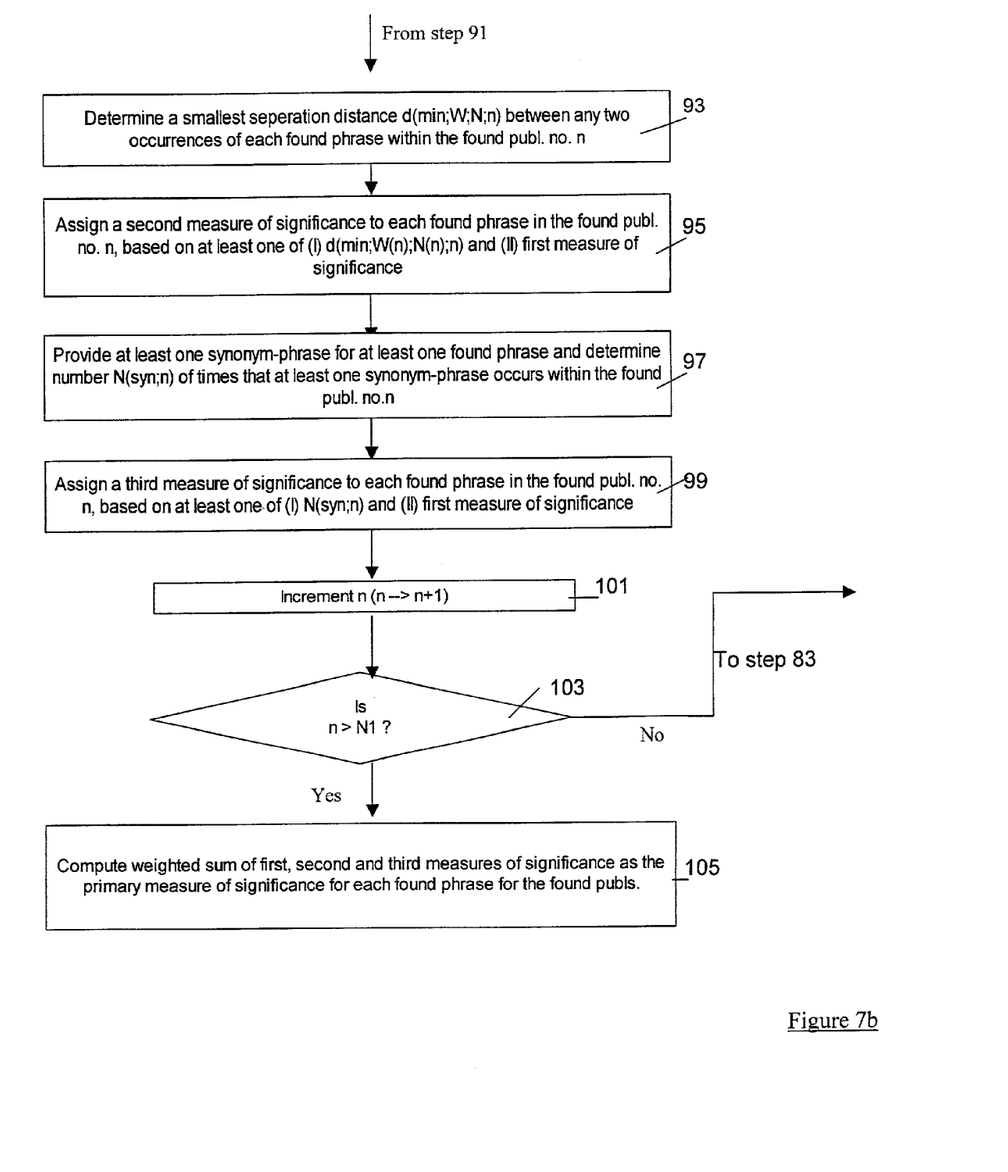

FIG. 7 illustrates an embodiment of a procedure for determining a primary measure of significance assigned to a found phrase in a found publication. In step 81, the system receives or is provided with a group of found publications, each having at least one occurrence of the specified search-phrase, assigns each found publication an integer in a consecutive list of integers (n=n0, n0+1, ..., n1), and initializes a counting index to n=n0. In step 83, the system identifies and places in a list for subsequent analysis and display each found phrase in the found publication no. n. A found phrase includes all m1-consecutive word phrases that occur at least m2 times within the found publication no. n, where m1 and m2 are system-specified or user-specified integers, with m1=1 and/or 2 and/or 3, and m2$\geq$1. A selected number M of the found phrases is optionally displayed, where M is a selected integer (M$\geq$0). In step 85, the system determines the number W(n) of words in, and the number N(n) of times a found phrase occurs in, the found publication no. n. In step 87 (optional), the system optionally determines a fraction N(n)/W(n) representing the frequency of occurrence of each found phrase in the found publication no. n.

In step 89, the system assigns, to each found phrase in the found publication no. n, a numerical value representing a first measure of significance, based on at least one of the number N(n), the fraction N(n)/W(n) and a fractional difference N(n)/W(n)−f(avg), where f(avg) is an estimate of an average frequency of occurrence for the found phrase in a selected group of publications (which may be, but is not necessarily, the original collection of publications). In step 91 (optional), for the found publication no. n, the system displays at least one of (i) the at least M m-consecutive word found phrases that occur, (ii) the number N(n), (iii) the fraction N(n)/W(n), the fractional difference N(n)/W(n)−f(avg), and (v) an indicium representing the first measure of significance.

In step 93 (optional), where a found phrase occurs at least twice in the found publication no. n, the system determines a smallest separation distance d(min;W(n);N(n);n) between any two occurrences of the found phrase within the found publication no. n, representing a "nearest neighbor" separation distance within the found publication no. n. In step 95 (optional), the system assigns a second measure of significance, based upon at least one of (i) the minimum separation distance d(min;W(n);N(n);n) for the found phrase and (ii) at least one parameter used for the first measure of significance.

In step 97 (optional), the system or user provides at least one synonym-phrase for one or more found phrases and determines a number N(syn;n) of times the at least one synonym-phrase occurs within the found publication no. n. In step 99 (optional), the system assigns a third measure of significance, based upon at least one of (i) the number N(syn;n) for the found phrase and (ii) at least one parameter used for the first measure of significance.

The user may specify which of the second and/or third measures of significance is to be determined, and optionally displayed, and may specify one or more parameters, if any, to be used to determine to determine such measure(s) of significance.

In step 101, the system increments the index n (n→n+1). In step 103, the system determines if n>n1, where n1−n0+1 is the number of found publications. If the answer to the query in step 103 is "no," the system returns to step 83. If the answer to the query in step 103 is "yes," for each found phrase (n=n0, n0+1, ..., n1), the system continues to step 105 and computes a weighted sum, using non-negative weight coefficients, of the first, second and third measures of significance for each found phrase in all the found publications. Each weight may be 0 or positive. This weighted sum is referred to herein as the "primary" measure of significance for each found phrase and is displayed in the analogue of FIG. 2.

One approach to determination of the first measure of significance uses a binomial distribution b(W;N;p) to compute and compare probability values for a found phrase in the found publication no. n, $$1 - P1 = \sum_{k=N(n)+1}^{W(n)} C(W(n);k) p^k (1-p)^{W(n)-k}, \quad (1)$$

$$1 - P2 = \sum_{k=N(avg)+1}^{W(n)} C(W(n);k) p^k (1-p)^{W(n)-k}, \quad (2)$$

$$p = f(avg) = N(avg)/W(n), \quad (3)$$

$$C(x;y) = x!/\{y!(x-y)!\}, \quad (4)$$

where f(avg) is an estimated average frequency of occurrence of the specified found phrase in the collection of publications. Note that P1 and P2 are increasing functions of the respective variables N(n) and N(avg). In one approach, if P2$\geq$P1, the found phrase is assigned a relatively low measure of significance, and this measure of significance increases monotonically with at least one of the following two variables: the ratio P1/P2 and the difference P1−P2. Definitions of the quantities 1−P1 and 1−P2 in Eqs. (1) and (2) may be replaced by more general probabilistic definitions, such as $$1-P1 = F(N(n);W(n);p), \quad (1')$$

$$1-P2 = F(N(avg);W(n);p), \quad (2')$$

where F(u;v;p) is a cumulative probability density function that is monotonically decreasing in u, for fixed v, and is monotonically increasing in v, for fixed u.

A similar probabilistic calculation and comparison can be carried through for the second measure of significance, involving the separation distance d(min;W;N). One easily verifies that $$d(\min;W(n);N(n);n)=0(W(n)<2N(n)-1). \quad (5)$$

For $W \geq 2N(n)-1$ and for a uniform distribution of the search-phrase, one verifies by consideration of cases that the average distance of separation is approximately $$d(avg;W(n);N(n)=2;n)=\{2W(n)^2-7W(n)+6\}/(6W(n)), \quad (6)$$

which has an asymptotic limit of W(n)/3 as W(n) increases without limit. For larger values of N(n), it appears that the average distance of separation is limited by $d(avg;W(n);N(n)) \leq W(n)/(N(n)+1)$ in the asymptotic limit of large W(n). For N(n) ($\geq 2$) occurrences of the found phrase in a found publication, the measured value d(min;W(n);N(n);n) is compared with d(avg;W(n);N(n);n) in determining the second measure of significance. In one approach, if $d(avg;W(n);N(n);n) \leq d(min;W(n);N(n);n)$, the found phrase is assigned a relatively low measure of significance, and this measure of significance increases monotonically with at least one of the following two variables: the ratio d(avg;W(n);N(n);n)/d(min;W(n);N(n);n) and the difference d(avg;W(n);N(n);n)−d(min;W(n);N(n);n).

What is claimed is:

1. A method for searching for one or more relevant publications in a collection of publications, the method comprising:

receiving a search-phrase whose occurrence is to be searched for in a selected collection of publications;

determining if at least one publication in the collection, referred to as a "found publication," contains the search-phrase;

when at least one found publication is identified:

associating a date of publication with each found publication;

identifying at least M m1-word phrases that each occurs at least m2 times in the at least one found publication, referred to as a "found phrase," where M, m1 and m2 are selected positive integers; and determining a numerical value for a secondary measure of significance for each found phrase in the at least one found publication, and displaying the found phrases with the M highest secondary measures;

providing said secondary measure of significance for at least one of said found phrases as a sum over all of said found publications of a primary measure of significance computed for said at least one found phrase;

computing said primary measure for said at least one found phrase by a procedure including:

determining a number W of words in said found publication and a number N of times said at least one found phrase appears in said found publication;

providing a frequency of occurrence N/W of said at least one found phrase in said found publication and an estimate of an average frequency of occurrence f(avg) of said at least one found phrase in a selected group of publications; and determining a first measure of significance of said at least one found phrase that depends upon at least one of the numbers N, N/W and N/W−f(avg);

where said at least one found phrase appears at least twice in said found publication, determining a smallest separation distance d(min;N;W) between two occurrences of said at least one found phrase in said found publication;

determining a distance measure of significance based upon the distance d(min;N;W);

providing at least one synonym-phrase for said at least one found phrase in said found publication;

determining a number N(syn) of occurrences of the synonym-phrase in said found publication;

determining a synonym measure of significance based upon the number N(syn); and providing said primary measure as a weighted sum of said first measure, the distance measure and the synonym measure for said at least one found phrase.

2. A system for searching for one or more relevant publications in a collection of publications, the system comprising a computer programmed:

to receive a search-phrase whose occurrence is to be searched for in a selected collection of publications;

to determine if at least one publication in the collection, referred to as a "found publication," contains the search-phrase;

when at least one found publication is identified:

to associate a date of publication with each found publication;

to identify at least M m1-word phrases that each occurs at least m2 times in the at least one found publication, referred to as a "found phrase," where M, m1 and m2 are selected positive integers;

to determine a numerical value of a secondary measure of significance for each found phrase in the at least one found publication, and displaying the found phrases with the M highest secondary measures;

to provide said secondary measure of significance for at least one of said found phrases as a sum over all of said found publications of a primary measure of significance computed for said at least one found phrase;

to compute said primary measure for said at least one found phrase by a procedure including:

determining a number W of words in said found publication and a number N of times said at least one found phrase appears in said found publication;

providing a frequency of occurrence N/W of said at least one found phrase in said found publication and an estimate of an average frequency of occurrence f(avg) of said at least one found phrase in a selected group of publications; and determining a first measure of significance of said at least one found phrase that depends upon at least one of the numbers N, N/W and N/W−f(avg);

where said at least one found phrase appears at least twice in said found publication, to determine a smallest separation distance d(min;N;W) between two occurrences of said at least one found phrase in said found publication;

to determine a distance measure of significance based upon the distance d(min;N;W);

to provide at least one synonym-phrase for said at least one found phrase in said found publication;

to determine a number N(syn) of occurrences of the synonym-phrase in said found publication;

to determine a synonym measure of significance based upon the number N(syn); and to provide said primary measure as a weighted sum of said first measure, the distance measure and the synonym measure for said at least one found phrase.

* * * * *